(12) United States Patent
Muroo et al.

(10) Patent No.: US 7,690,689 B2
(45) Date of Patent: Apr. 6, 2010

(54) SADDLE-TYPE VEHICLE

(75) Inventors: Sakio Muroo, Shizuoka (JP); Hisashi Morikawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 621 days.

(21) Appl. No.: 11/467,485

(22) Filed: Aug. 25, 2006

(65) Prior Publication Data

US 2007/0200332 A1  Aug. 30, 2007

(30) Foreign Application Priority Data

Aug. 30, 2005  (JP) ............................. 2005-249311

(51) Int. Cl.
*B60P 3/22* (2006.01)
(52) U.S. Cl. ...................... 280/833; 280/835
(58) Field of Classification Search ............... 280/833, 280/783, 834, 835; 180/219
See application file for complete search history.

(56) References Cited

U.S. PATENT DOCUMENTS

| 3,987,294 A | * | 10/1976 | Carlson ................... 362/101 |
| 4,416,446 A | * | 11/1983 | Murakami ............... 267/140.3 |
| 4,469,190 A | * | 9/1984 | Yamaguchi ................ 180/219 |
| 5,330,028 A | * | 7/1994 | Handa et al. .............. 180/219 |
| 5,692,578 A | * | 12/1997 | Miyakawa et al. ......... 180/68.3 |
| 5,884,380 A | * | 3/1999 | Thurm ..................... 29/401.1 |
| 5,902,158 A | * | 5/1999 | Nakase et al. ............. 440/88 R |
| 6,213,514 B1 | * | 4/2001 | Natsume et al. ........... 280/833 |
| 6,253,790 B1 | * | 7/2001 | Hara ..................... 137/565.17 |
| 6,341,792 B1 | * | 1/2002 | Okuma ................... 280/304.3 |
| 6,409,189 B1 | * | 6/2002 | Orimoto et al. ......... 280/86.751 |
| 6,478,335 B2 | * | 11/2002 | Reed ....................... 280/835 |
| 6,641,169 B2 | * | 11/2003 | Fukunaga et al. .......... 280/835 |
| 6,896,293 B2 | * | 5/2005 | Philipps et al. ............ 280/833 |
| 6,910,716 B2 | * | 6/2005 | Kurayoshi et al. ......... 280/835 |
| 7,252,170 B2 | * | 8/2007 | Miyakozawa et al. ...... 180/219 |
| 7,410,191 B2 | * | 8/2008 | Karube et al. .............. 280/833 |
| 2006/0175112 A1 | * | 8/2006 | Yoshida et al. ............. 180/229 |

FOREIGN PATENT DOCUMENTS

JP          06-234382          8/1994

* cited by examiner

*Primary Examiner*—Tony H. Winner
(74) *Attorney, Agent, or Firm*—Keating & Bennett, LLP

(57) ABSTRACT

A saddle-type vehicle that securely supports a fuel tank with sufficient strength when load in a vertical direction is applied. A pair of frame members extend in a front-and-rear direction of the vehicle and support a fuel tank. The fuel tank has a pair of flanges contacting the outer sides of the frame members. The flanges are attached to the frame members by attachment members inserted from outside in a vehicle width direction.

12 Claims, 10 Drawing Sheets

[Fig. 1]
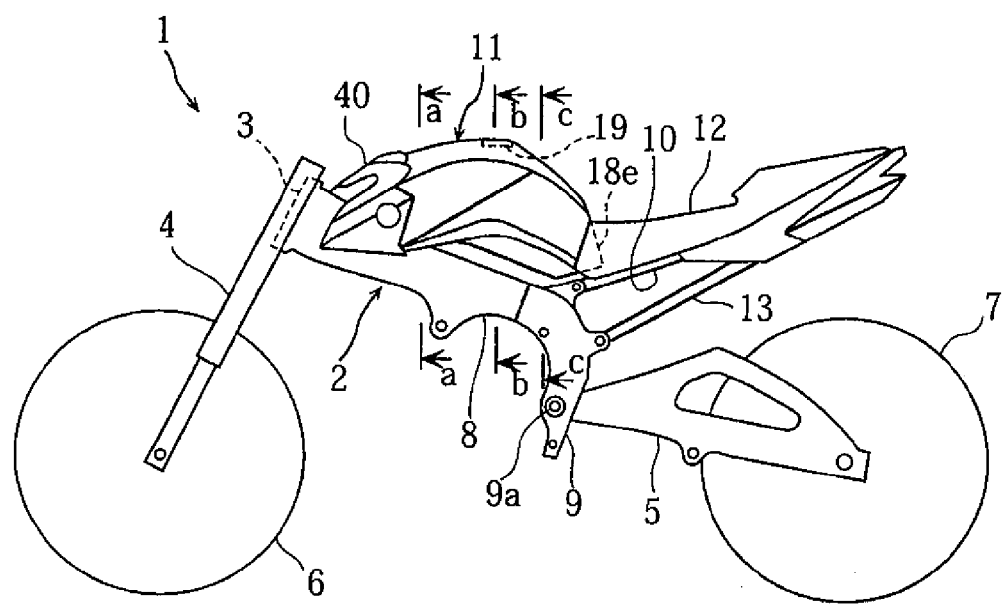

[Fig. 2]
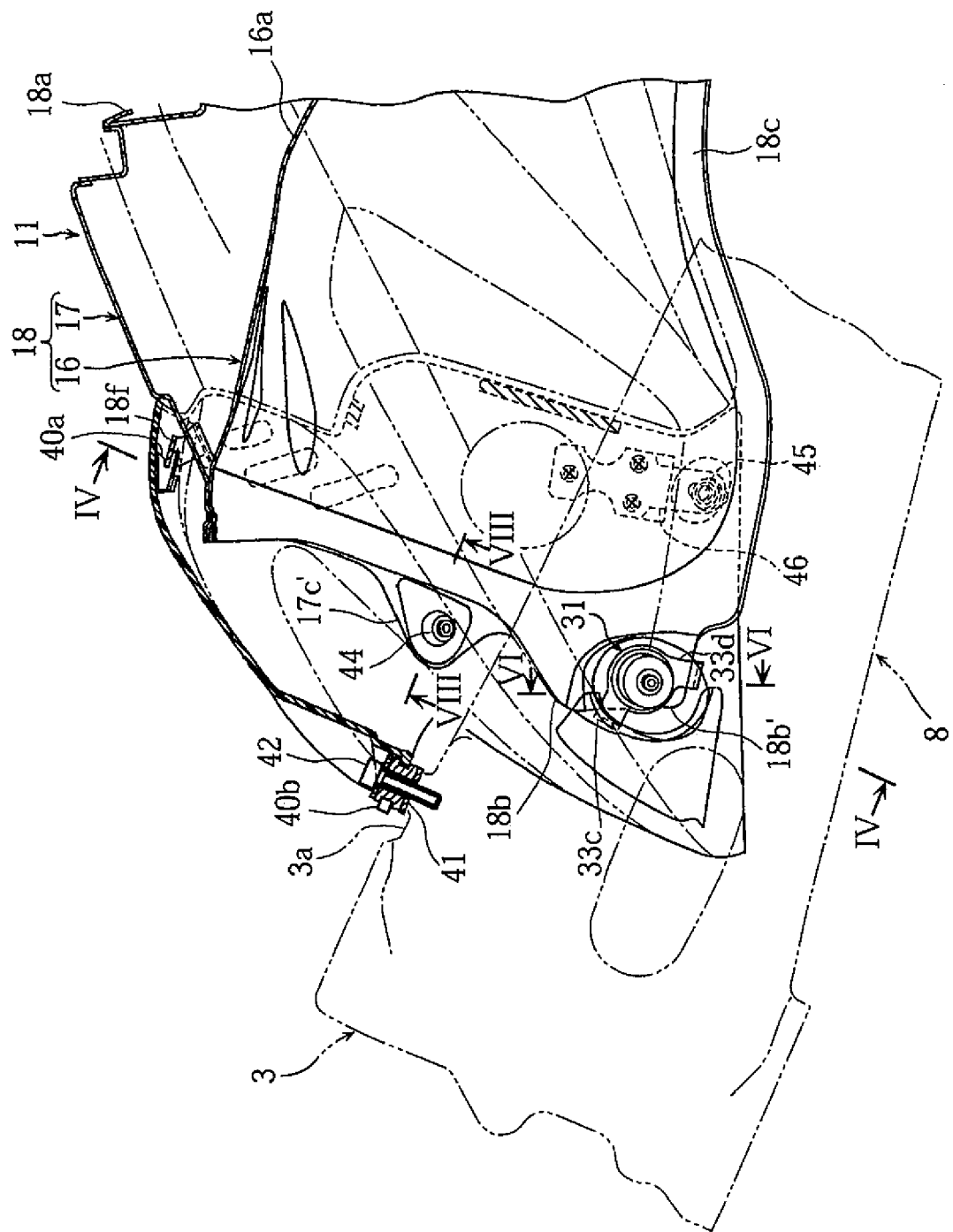

[Fig. 3]
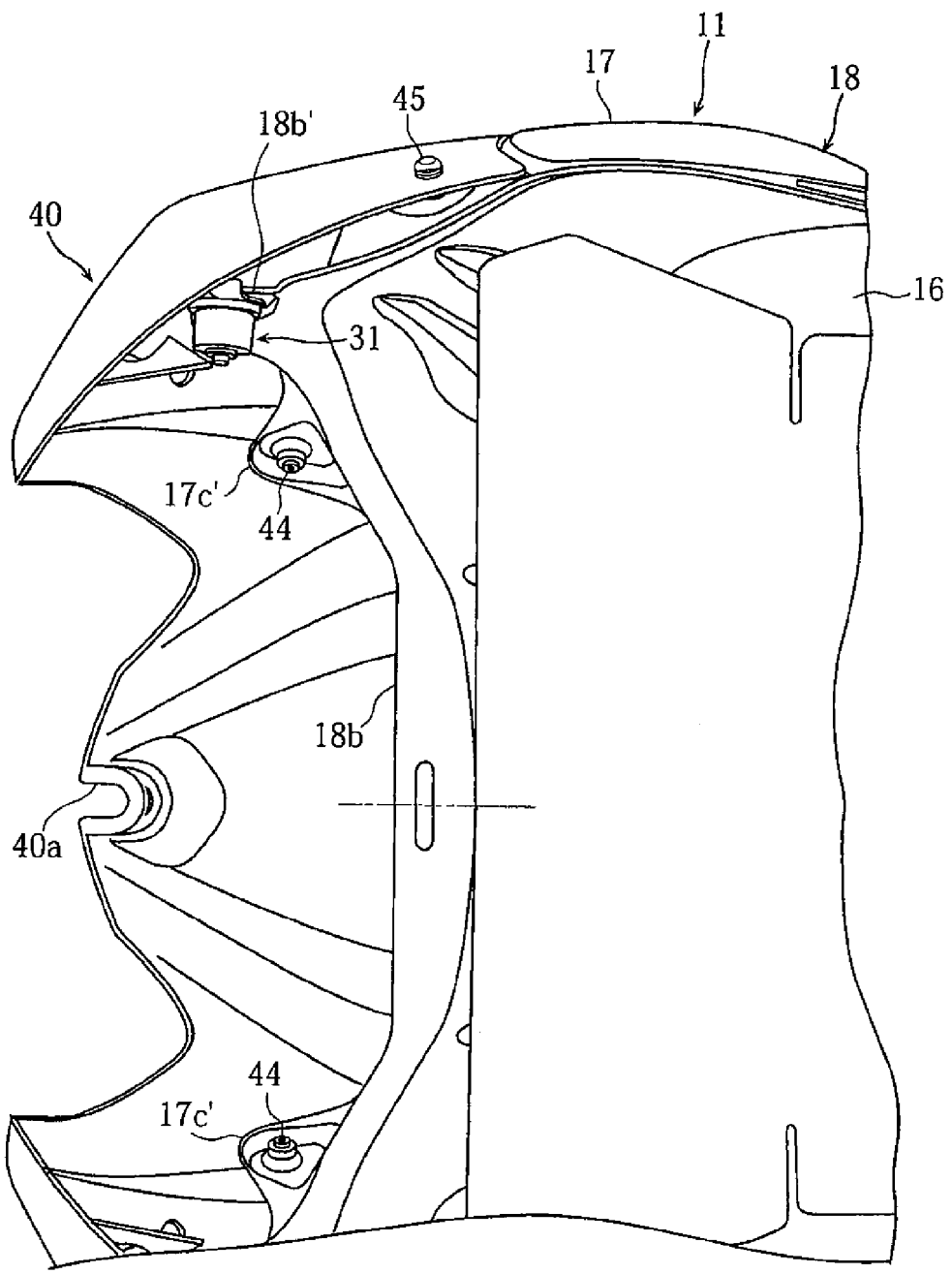

[Fig. 4]
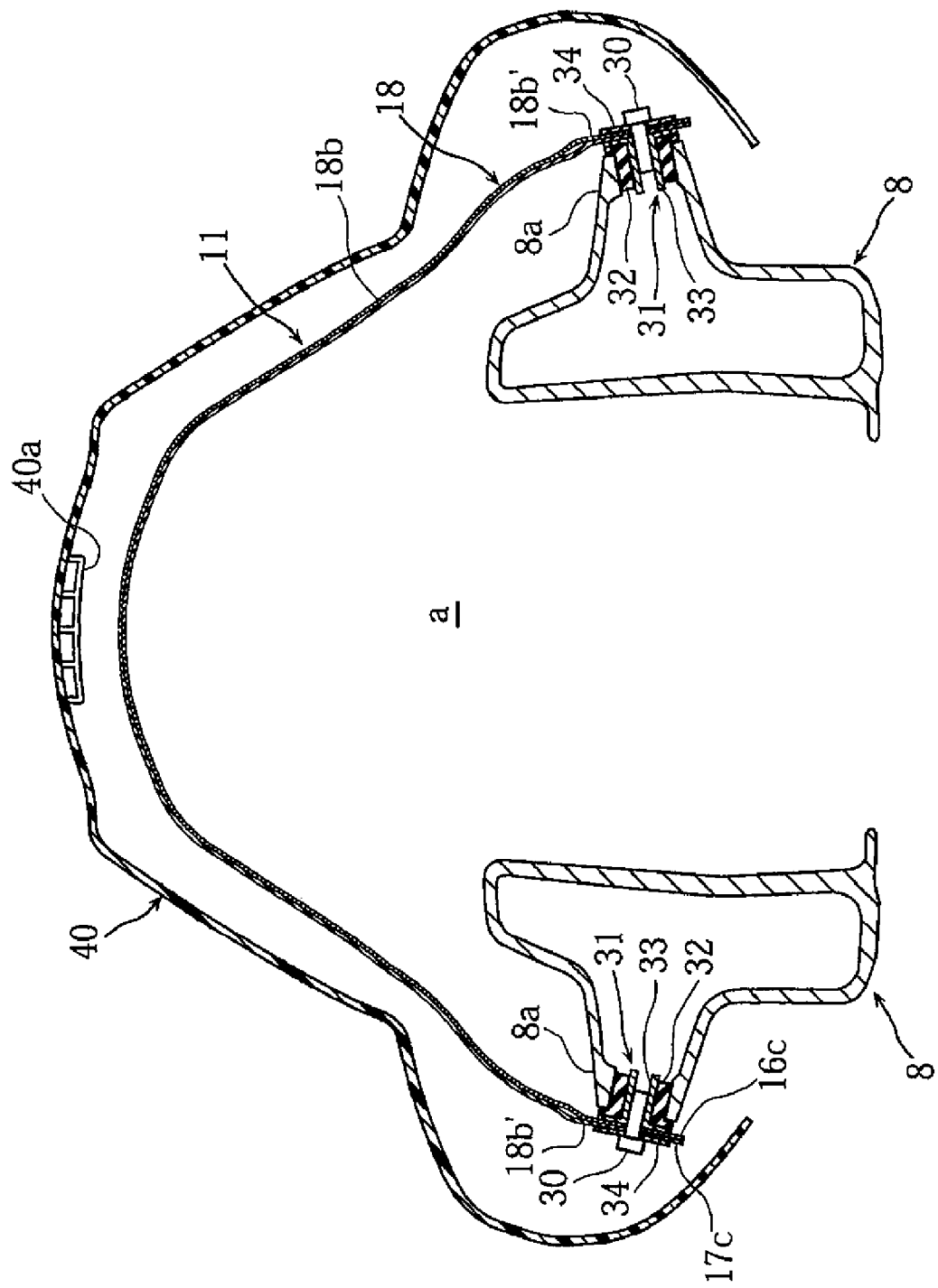

[Fig. 5]
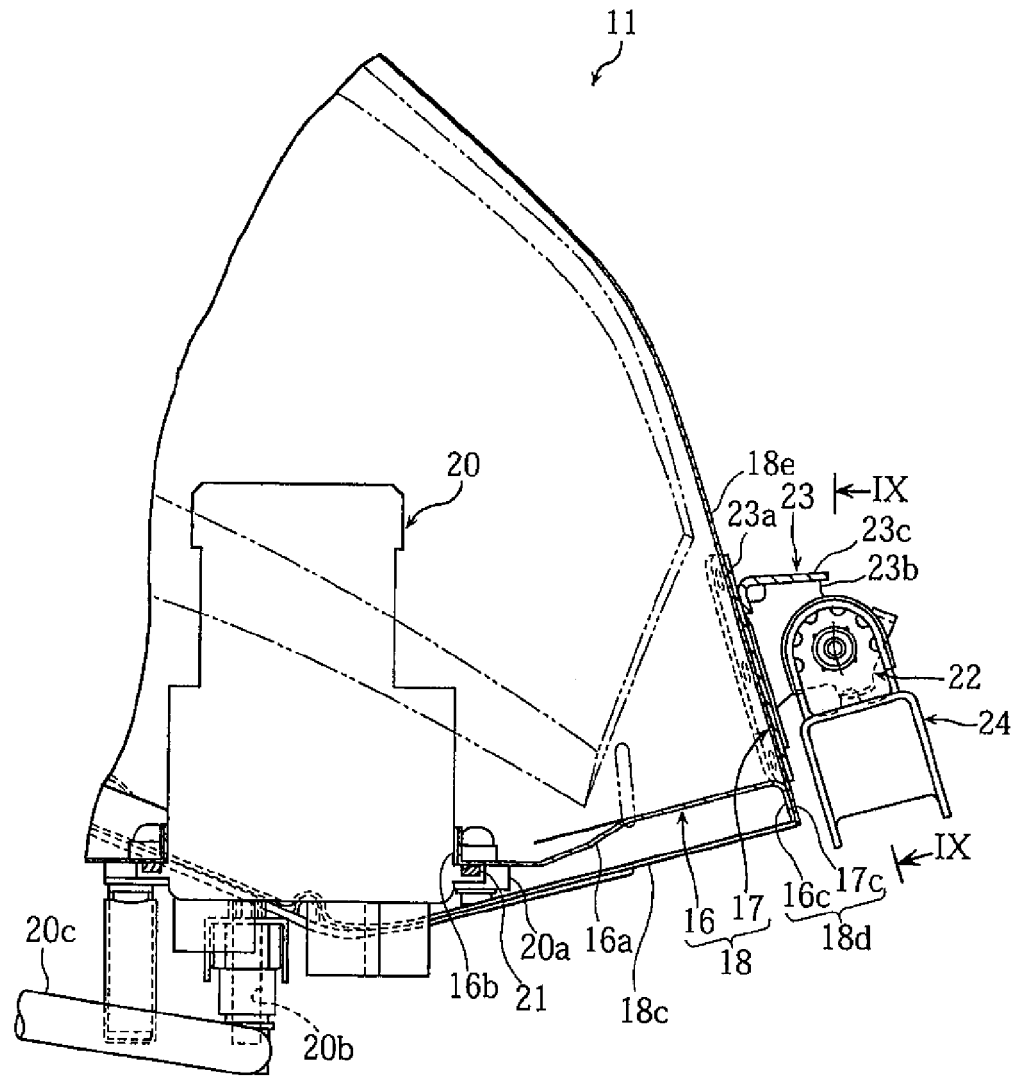

[Fig. 6]
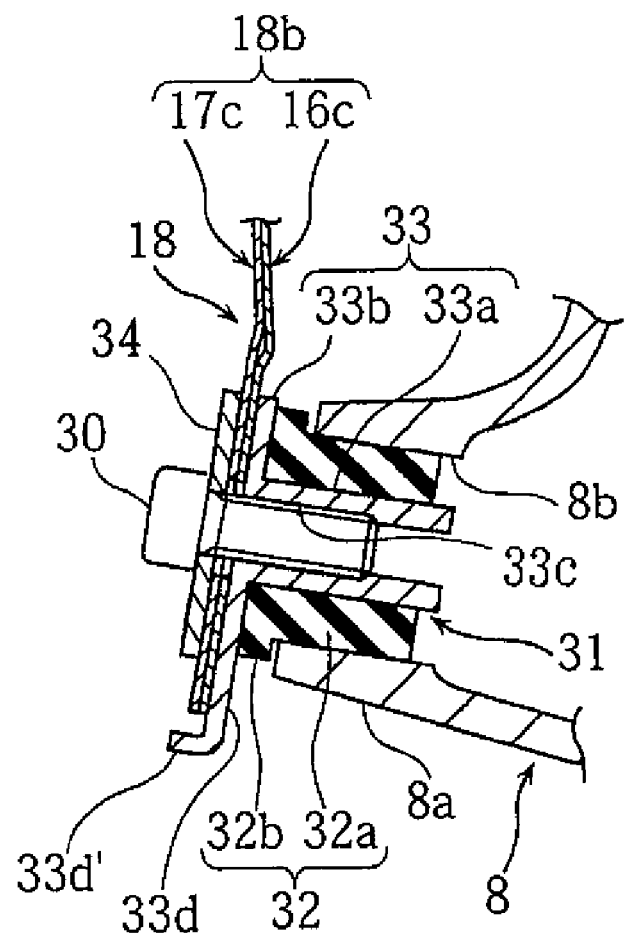

[Fig. 7]
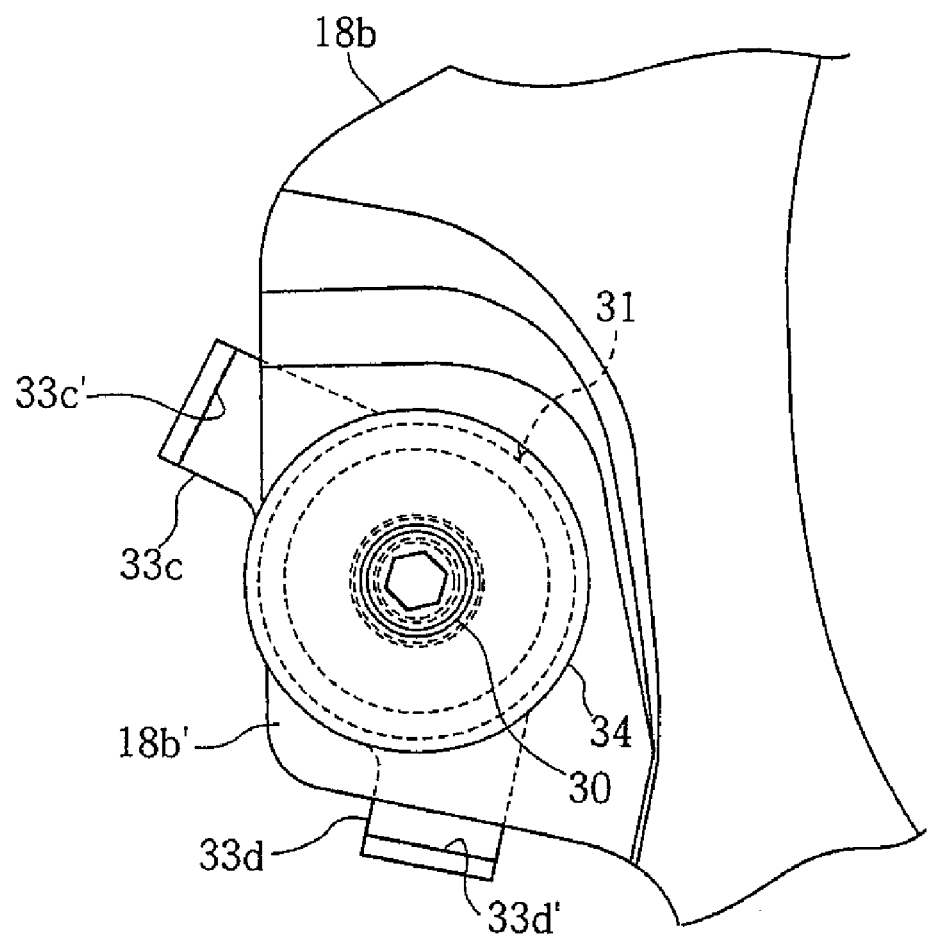

[Fig. 8]
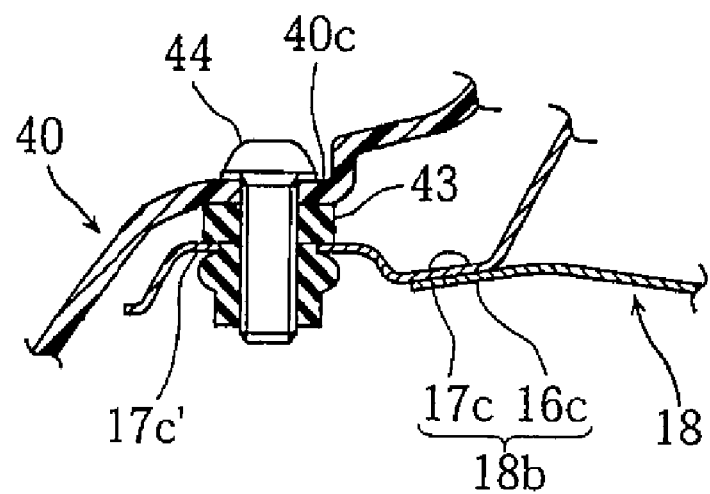

[Fig. 9]
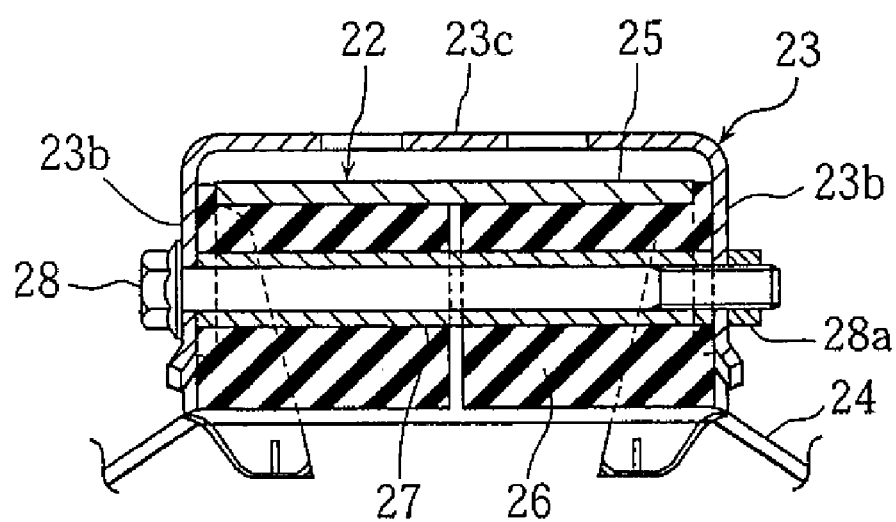

[Fig. 10]
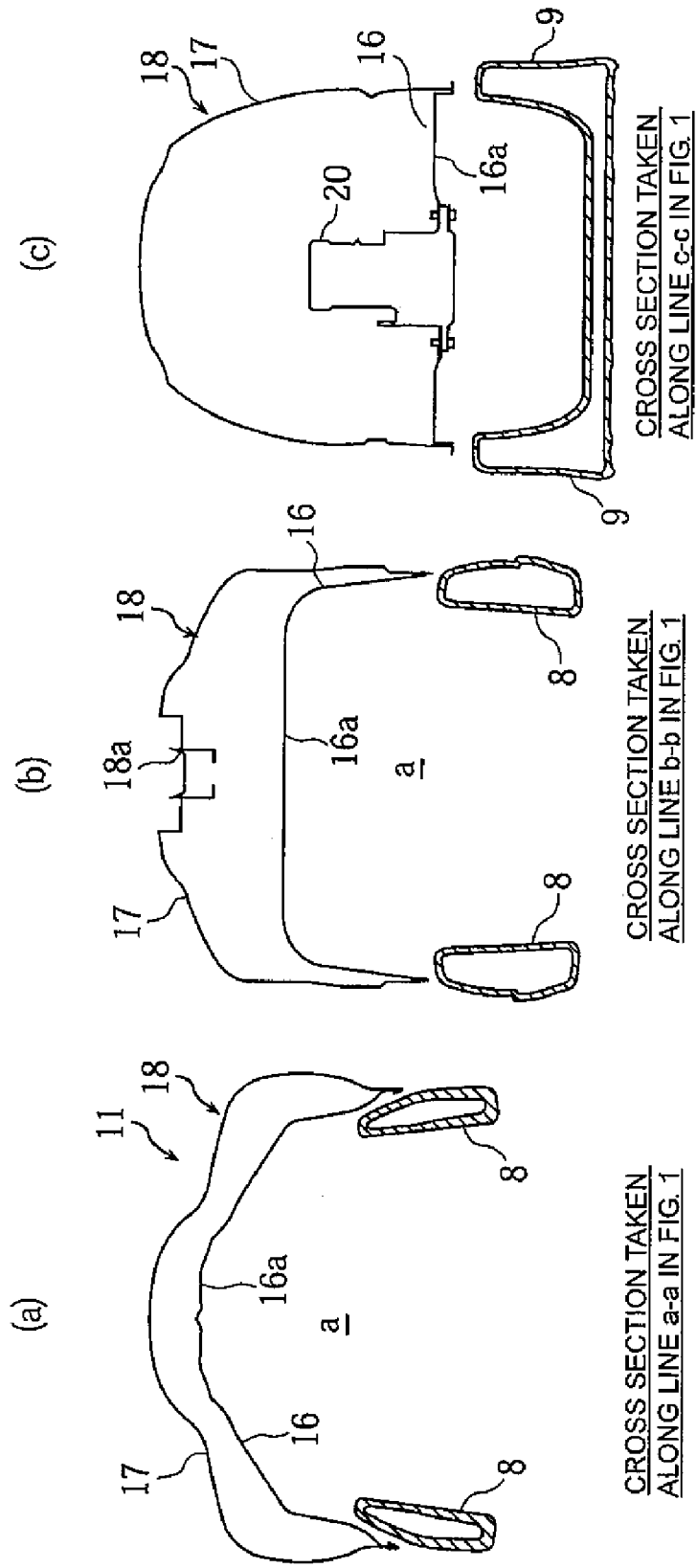

SADDLE-TYPE VEHICLE

RELATED APPLICATIONS

This application claims the benefit of priority under 35 USC 119 of Japanese patent application no. 2005-249311, filed on Aug. 30, 2005, which application is hereby incorporated by reference in its entirety.

BACKGROUND OF THE INVENTION

1. Field of the Invention

This invention relates to a saddle-type vehicle including left and right frame members extending in a front-and-rear direction of the vehicle and a fuel tank supported by the frame members.

2. Description of Related Art

A typical saddle-type vehicle, such as a motorcycle, has left and right frame members extending from a head pipe toward the rear of the vehicle, a fuel tank placed on the frame members, and a saddle-type seat disposed behind the fuel tank.

A typical structure for attaching the fuel tank in a motorcycle of this type is disclosed in JP-A-6-234382. According to this structure, substantially U-shaped brackets (19) which are open to the front are fixed to the left and right side walls of the fuel tank. The left and right brackets (19) engage with positioning members (21) fixed to left and right frame members (20). Under this condition, the rear end of the fuel tank is secured to the frame members by bolts.

In the motorcycle of JP-A-6-234382, each of the positioning members (21) of the left and right frame members is sandwiched between an upper side (19a) and a lower side (19b) of the corresponding bracket (19) of the fuel tank. Thus, load in a vertical direction generated from a road surface expands the distance between the upper side (19a) and the lower side (19b). In extreme cases, the load causes deformation of the brackets. To overcome this drawback, a reinforcing material such as a patch can be added to the structure. In this case, however, the number of components increases and the cost rises.

SUMMARY OF THE INVENTION

The invention has been developed to solve the above problems. It is an object of the invention to provide a saddle-type vehicle capable of securely supporting a fuel tank with sufficient strength when load in the vertical direction is applied.

A saddle-type vehicle according to the invention includes a pair of frame members extending in a front-and-rear direction of the vehicle, and a fuel tank supported by the frame members. The fuel tank has a pair of flanges contacting outer sides of the frame members and attached to the frame members by attachment members inserted from outside in a vehicle width direction.

In the saddle-type vehicle according to the invention, the flanges of the fuel tank contact the outer sides of the frame members, and the flanges are attached to the frame members by attachment members inserted from outside in a vehicle width direction. Thus, load acting to bend the flanges is reduced and deformation of the flanges is avoided. Accordingly, the fuel tank is securely supported with sufficient strength.

In the saddle-type vehicle according to the invention, the flanges of the fuel tank are directly attached to the outer sides of the frame members. Accordingly, the numbers of required components and assembly processes are decreased and the cost is lowered compared with a case in which intermediate components are interposed or additional reinforcing members are equipped.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to an embodiment of the invention.

FIG. 2 is a side cross-sectional view of a front part of a fuel tank provided on the motorcycle.

FIG. 3 is a bottom view of the front part of the fuel tank.

FIG. 4 is a cross-sectional view of the fuel tank taken along line IV-IV in FIG. 2.

FIG. 5 is a side cross-sectional view of a rear part of the fuel tank.

FIG. 6 is a cross-sectional view of the fuel tank taken along line VI-VI in FIG. 2.

FIG. 7 is a side view of an attachment member of the fuel tank.

FIG. 8 is a cross-sectional view of the fuel tank taken along line VIII-VIII in FIG. 2.

FIG. 9 is a cross-sectional view of the fuel tank taken along line IX-IX in FIG. 5.

FIGS. 10(a)-10(c) are cross-sectional views of the fuel tank.

DETAILED DESCRIPTION OF THE INVENTION

An embodiment of the invention is hereinafter described with reference to the appended drawings.

FIGS. 1-10 show a saddle-type vehicle in an embodiment according to the invention. In this embodiment, a motorcycle on which a saddle-type seat is placed is discussed. The front-and-rear direction and left-and-right direction in this embodiment refer to the front-and-rear direction and left- and right direction as viewed by a person sitting on the seat.

In these figures, a motorcycle 1 is shown. The motorcycle 1 includes a backbone-type vehicle body frame 2, an engine unit (not shown) supported by the vehicle body frame 2, a front fork 4 supported by a head pipe 3 formed integrally with the front end of the frame 2 such that the front fork 4 can freely turn to the left and right, and a rear arm 5 supported by the rear end of the vehicle body frame 2 such that the rear frame 5 can freely swing upward and downward. A front wheel 6 is supported by the lower end of the front fork 4, and handlebars (not shown) are fixed to the upper end of the front fork 4. A rear wheel 7 is supported by the rear end of the rear arm 6.

The vehicle body frame 2 has a pair of left and right frame members 8, 8 extending from the head pipe 3 to the rear of the vehicle while expanding outward in the vehicle width direction; left and right rear arm brackets 9, 9 extending downward substantially in the vertical direction from the rear ends of the left and right frame members 8, 8; and left and right seat rails 10, 10 and left and right seat stays 13, 13 extending diagonally upward to the rear of the vehicle from the left and right rear arm brackets 9.

A fuel tank 11 is mounted on the left and right frame members 8. A saddle-type seat 12 on which a rider sits astride is placed on the left and right seat rails 10 behind the fuel tank 11. An engine unit (not shown) is suspended by the left and right frame members 8 and rear arm brackets 9. The rear arm 6 is supported by the lower ends of the rear arm brackets 9 via a pivot shaft 9a.

In the fuel tank 11, a fuel tank injection port 18a is provided on an upper wall of a tank main body 18 which is formed by oil-tightly combining peripheral edges 16c and 17c of lower tank half body 16 and higher tank half body 17, respectively, by welding. The fuel injection port 18a is opened and closed by a fuel cap 19.

The upper tank half body 17 is substantially bowl-shaped largely expanding in the upward direction. The rear part of a bottom wall 16a of the lower tank half body 16 is substantially flat. The bottom wall 16a is bent such that it rises from the rear part to the front. A pump attachment opening 16b is formed at the lowermost position in the rear part of the bottom wall 16a. A not-shown air cleaner is disposed within a space a formed below the front part of the bottom wall 16a of the lower tank half body 16 (see FIGS. 4 and 10(a)-(c)).

A fuel pump unit 20 is disposed within the tank main body 18. As illustrated in FIG. 5, the fuel pump unit 20 is inserted into the tank from below through the pump attachment opening 16b, and an attachment flange 20a is detachably fixed to the opening peripheral edge of the pump attachment opening 16b by a bolt via a seal member 21. A fuel supplying port 20b is provided on the bottom face of the fuel pump unit 20. A fuel hose 20c for supplying fuel to a fuel injection valve (not shown) is connected to the supplying port 20b.

An attachment bracket 23 is attached to a rear wall 18e of the tank main body 18. The fuel tank 11 is supported by the vehicle body frame 2 via a supporting member 22, which is inserted into the attachment bracket 23 in the vehicle width direction, such that the fuel tank 11 can vertically swing. More specifically, the following structure is employed.

As illustrated in FIGS. 5 and 9, the attachment bracket 23 has a base 23a fixed to the rear wall 18e, left and right side pieces 23b, 23b projecting from the base 23a toward the rear, and an upper side piece 23c connecting the upper ends of the left and right side pieces 23b. The attachment bracket 23 on the rear wall 18e is covered by the front end of the seat 12 and cannot be seen from outside.

The supporting member 22 is disposed on the cross member 24 connecting the left and right seat rails 10. The supporting member 22 has a U-shaped supporting portion 25 which is open to below and fixed to the cross member 24, a rubber damper (elastic portion) 26 disposed within the supporting portion 25, a collar 27 inserted into the rubber damper 26 in the vehicle width direction, and a bolt 28 inserted into the collar 27 from the outer side of the vehicle.

The bolt 28 is inserted into the collar 27 such that the bolt 28 penetrates through the left and right side pieces 23b of the attachment bracket 23. Then, a nut 28a is attached to the bolt 28 and tightened to fix the fuel tank 11 such that the fuel tank can vertically swing.

A front side flange 18b, left and right side flanges 18c, and a rear side flange 18d are constituted by the peripheral edges 16c and 17c of the lower and upper tank half bodies 16 and 17.

The left and right side flanges 18c and the rear side flange 18d project downward along the lower end of the tank main body 18. The front side flange 18b extends upward from the front ends of the left and right flanges 18c, 18c and projects frontward. As illustrated in FIG. 4, the front side flange 18b has a circular-arc shape which extends from the upper side to the left and right sides and expands in the vehicle width direction in the lower part as viewed in lateral cross-section.

The lower portion of the front side flange 18b extends toward the front covering the outer sides of the left and right frame members 8, 8. Extensions as frame attachment members 18b' are provided at the left and right ends of the front side flange 18b.

The left and right frame attachment members 18b' are inclined such that the distance between the frame attachment members 18b' at the lower position is larger in the vehicle width direction than that at the upper position.

The left and right frame attachment members 18b' of the fuel tank 11 are attached to the outer sides of the left and right frame members 8, 8 by tightening bolts (attachment members) 30, 30 with dampers (damping members) 31, 31 interposed between the frame members 8, 8 and the bolts 30, 30. More specifically, the following structure is employed.

The left and right frame members 8, 8 have oblong rectangular shapes in the lateral cross section. Bosses 8a, 8a projecting outward in the vehicle width direction are formed integrally with the outer sides of the left and right frame members 8. The outer end faces of the left and right bosses 8a are inclined such that the distance between the bosses 8a at the lower position is larger than that at the upper position and extend in parallel with the frame members 18b'.

Each of the left and right dampers 31 attached to the bosses 8a has a rubber damper main body (elastic member) 32, and a metal collar member 33 inserted into the damper main body 32.

The damper main body 32 has a cylindrical member 32a inserted into the boss hole 8b, and a flange member 32b formed integrally with the outer peripheral edge of one end of the cylindrical member 32a.

As illustrated in FIG. 6, the collar member 33 has a cylindrical body 33a which is inserted into the cylindrical member 32a and has a screw hole 33c, and a flange body 33b which is formed at the outer peripheral edge of one end of the cylindrical body 33a and contacts the flange member 32b.

A rotation preventing member 33c which extends outward in the radius direction is formed integrally with the flange body 33b. The rotation preventing member 33c projects toward the front from the front edge of the frame attachment member 18b'. A bended engaging member 33c' engaging with the front edge of the frame attachment member 18b' is formed at the front end of the rotation preventing member 33c. When the tightening bolt 30 is screwed and the collar member 33 is rotated, the rotation preventing member 33c comes into contact with the front edge of the frame attachment member 18b'. As a result, rotation of the collar member 33 is stopped.

A positioning member 33d extending outward in the radius direction is formed integrally with the flange body 33b. The positioning member 33d projects downward below the lower edge of the frame attachment member 18b'. A bended supporting member 33d' which can contact the lower edge of the frame attachment member 18b' is formed at the lower end of the positioning member 33d. Each of the frame attachment members 18b' and the dampers 31 can be positioned by placing the fuel tank 11 from above the frame and bringing the lower edges of the left and right frame attachment members 18b' into contact with the positioning members 33d.

The fuel tank 11 is fixed to the bosses 8a of the left and right frame members 8 by screwing the tightening bolts 30 into the screw holes 33c on the cylindrical bodies 33a of the collar members 33 from the outer sides in the vehicle width direction via the frame attachment members 18b'. Washers 34 are also provided.

For fitting the fuel tank 11 to the vehicle body frame 2, the dampers 31 are initially attached to the left and right bosses 8a. Then, the fuel tank 11 is placed on the left and right frame members 8 from above, and simultaneously the attachment bracket 23 is brought into engagement with the supporting member 22. Under this condition, the bolt 28 is inserted from the left side to temporarily hold the attachment bracket 23 by the supporting member 22. Then, the front part of the fuel tank 11 is pivoted downward around the bolt 28, and the lower edges of the left and right attachment frames 18b' are brought into contact with the positioning members 33d to position the fuel tank 11.

In this structure, the left and right frame attachment members 18b' of the fuel tank 11 are diagonally disposed such that the distance between the frame attachment members 18b' at the lower position is larger than that at the upper position, and the outer end faces of the left and right bosses 8a are inclined at the same angles. Thus, the fuel tank 11 can be appropriately attached even when a certain dimensional error is produced between the attachment members 18b and the bosses 8a.

Next, the tightening bolts 30 are screwed into the collar members 33 from the outer left and right sides via the left and right attachment members 18b' to be tightened, and the bolt 28 is also tightened. Since the left and right frame attachment members 18b' are positioned in the vertical direction by the positioning members 33d, the attachment members 18b' and the collar members 33 are easily centered. When the collar members 33 are rotated at the time of tightening the tightening bolts 30, the rotation preventing members 33c come into contact with the front edges of the attachment members 18b' and thus rotation of the collar members 33 is stopped.

The front region of the fuel tank 11 is covered by a resin tank cover 40 as a component constituting the external appearance. The tank cover 40 covers the front end of the tank main body 18 including the front side flange 18b and the left and right attachment members 18b', and forms a surface continuing from the tank main body 18.

The tank cover 40 is fixed to the tank main body 18 and the vehicle body frame 2, and has the following structure described in detail.

A claw 40a which engages with a gate-shaped positioning piece 18f formed at the front end face of the tank main body 18 is provided on the inner surface of the upper wall of the tank cover 40. The movements of the tank cover 40 in the up-and-down direction, left-and-right direction, and the rearward direction are prevented by the engagement between the claw 40a and the positioning piece 18f.

A front attachment seat 40b is concaved on the front wall of the tank cover 40. The front attachment seat 40b and a fixing bracket 41 of the air cleaner (not shown) disposed below the tank main body 18 are co-tightened by a bolt 42 to be fixed to a frame connecting member 3a of the head pipe 3. Since the tank cover 40 and the fixing bracket 41 of the air cleaner are co-tightened and fixed to the frame connecting member 3a of the rigid head pipe 3, the attachment rigidities of the tank cover 40 and the fixing bracket 41 can be enhanced.

Stepped left and right attachment seats 40c, 40c are formed on the left and right side walls of the tank cover 40. The left and right attachment seats 40c are fixed to extensions 17c' extending from the front side flange 18b by bolts 44 via rubber dampers 43. The left and right lower ends of the tank cover 40 are fixed to attachment pieces 46 joined to the tank main body 18 by bolts 45.

In this embodiment, the left and right frame attachment members 18b' of the front side flange 18b of the fuel tank 11 are brought into contact with the outer end faces of the bosses 8a formed on the outer sides of the left and right frame members 8, 8, and the left and right attachment members 18b' are fixed to the bosses 8a by tightening bolts 30 inserted from outer sides in the vehicle width direction. Thus, load generated from the road surface in the vertical direction is prevented from acting on the left and right attachment members 18b' in the bending directions. Accordingly, deformation of the front flange 18b is avoided, and the strength for supporting the fuel tank 11 is secured.

In this embodiment, the left and right attachment members 18b' of the fuel tank 11 are directly attached to the bosses 8a of the left and right frame members 8. Since additional intermediate stays or reinforcing components are unnecessary, the numbers of the required components and assembly processes are not increased and thus the cost is not raised.

In this embodiment, the dampers 31, each of which has a rubber damper main body 32 and a collar member 33 attached to the damper main body 32, are fitted to the bosses 8a of the left and right frame members 8, and the tightening bolts 30 are tightened and fixed to the collar members 33 via the left and right attachment members 18b' of the fuel tank 11. Since the fuel tank 11 is elastically supported by the frame members 8 via the dampers 31, vibration generated from the road surface is not transmitted to the fuel tank 11.

In this embodiment, the rotation preventing members 33c which prevent rotation of the collar members 33 by contacting the front edges of the attachment members 18b' are provided on the collar members 33. Accordingly, rotation of the collar members 33 is stopped at the time of tightening the tightening bolts 30, and thus the attachment members 18b' are securely fixed to the bosses 8a.

In this embodiment, the positioning members 33d for positioning the fuel tank 11 in the vertical direction are provided on the collar members 33. Accordingly, the fuel tank 11 is easily positioned at the time of attaching the fuel tank 11 to the frame members 8, 8 from above, and thus the work efficiency is enhanced.

In this embodiment, the outer end faces of the left and right attachment members 18b' and the left and right bosses 8a are diagonally disposed such that the distances between the left and right attachment members 18b' and between the left and right bosses 8a are larger at the lower position than those at the upper position. Accordingly, a certain dimensional error between the attachment members 18b' and the bosses 8a at the time of attachment of the fuel tank 11 from above the frame can be absorbed, and thus the fuel tank 11 is easily and securely fitted.

In this embodiment, the attachment bracket 23 is fixed to the rear wall 18e of the fuel tank 11, and the bracket 23 is supported in such a manner as to be movable in the upward and downward directions by the bolt 28 inserted in the vehicle width direction via the supporting member 22 secured to the vehicle body frame 2. Thus, assembly of the fuel tank 11 is easily carried out by pivoting the front part of the fuel tank 11 from the upper position to the lower position around the bolt 28. Moreover, since the supporting member 22 is made of elastic material, transmission of vibration generated from the road surface to the fuel tank 11 is avoided.

Since the front side flange 18b including the left and right attachment members 18b' of the fuel tank 11 is covered by the tank cover 40, deterioration of the external appearance caused by exposure of the attachment members of the fuel tank 11 to the outside is avoided.

While the invention has been described primarily with respect to a motorcycle, the invention encompasses other saddle-type vehicles such as a small three-wheel or four-wheel vehicle, an ATV (all terrain vehicle), a snowmobile, and other saddle-type vehicles. Thus, the invention is applicable to any vehicles that have a saddle-type seat on which a rider sits astride.

The particular embodiments of the invention described in this document should be considered illustrative, rather than restrictive. Modification to the described embodiments may be made without departing from the spirit of the invention as defined by the following claims.

The invention claimed is:

1. A saddle vehicle, comprising:
   a pair of frame members extending in a front-and-rear direction of the vehicle; and
   a fuel tank supported by the frame members, wherein
   the fuel tank has a pair of flanges contacting outer sides of the frame members and the fuel tank includes a plurality of bodies, wherein
   the bodies include peripheral edges; and
   the flanges are attached to the frame members by attachment members inserted from outside in a vehicle width direction,
   wherein the flanges are formed with the peripheral edges of the bodies.

2. A saddle vehicle according to claim 1, wherein:
   bosses projecting outward in the vehicle width direction are provided on the outer sides of the frame members; and
   the flanges of the fuel tank are attached to outer end faces of the bosses.

3. A saddle vehicle according to claim 1, wherein:
   the attachment members are tightening bolts;
   damping members comprising an elastic member and a collar member formed on the elastic member and a screw hole are inserted into the frame members; and
   the fuel tank is fixed to the frame members by screwing the tightening bolts into the screw holes of the collar members via the flanges.

4. A saddle vehicle according to claim 3, wherein the collar members have rotation preventing members for preventing rotation of the collar members by contacting distal ends of the flanges.

5. A saddle vehicle according to claim 3, wherein the collar members have positioning members for positioning the fuel tank in a vertical direction.

6. A saddle vehicle according to claim 1, and further comprising a tank cover for covering attachment areas of the flanges attached to the frame members fitted to the fuel tank.

7. A saddle vehicle according to claim 1, and further comprising:
   a cross member for connecting the frame members; and
   a supporting member for supporting a rear end of the fuel tank equipped on the cross member such that the rear end of the fuel tank can vertically swing.

8. A saddle vehicle according to claim 7, wherein the supporting member has a supporting portion attached to the cross member, an elastic portion disposed within the supporting portion, a collar inserted into the elastic portion in the vehicle width direction, and a bolt inserted into the collar to support the rear end of the fuel tank.

9. A saddle vehicle according to claim 1, wherein the flanges are connected to each other at upper portions thereof.

10. A saddle vehicle according to claim 9, wherein in a lateral cross-section of the fuel tank where the flanges are attached to the frame members, the flanges extend generally arcuately and laterally downward from the upper portions in a manner such that the flanges expand outside in the vehicle width direction wider as the flanges extend lower.

11. A saddle vehicle according to claim 10, wherein axes of the attachment members extend lower as the axes approach closer to the center of the vehicle in the vehicle width direction.

12. A saddle vehicle, comprising:
   a pair of frame members extending in a front-and-rear direction of the vehicle;
   a fuel tank supported by the frame members, wherein
   the fuel tank has a pair of flanges contacting outer sides of the frame members;
   the flanges are attached to the frame members by attachment members inserted from outside in a vehicle width direction;
   bosses projecting outward in the vehicle width direction are provided on the outer sides of the frame members; and
   the flanges of the fuel tank are attached to outer end faces of the bosses;
   wherein outer end faces of the flanges of the fuel tank and the bosses of the frame members are diagonally disposed such that distances between the flanges and between the bosses at a lower position are larger than those at a higher position in the vehicle width direction.

* * * * *